(12) United States Patent
Malik et al.

(10) Patent No.: US 9,216,493 B2
(45) Date of Patent: Dec. 22, 2015

(54) METHODS OF IMPROVING SINTERING OF PCD USING GRAPHENE

(71) Applicants: Abds-Sami Malik, Westerville, OH (US); Hui Zhang, Columbus, OH (US)

(72) Inventors: Abds-Sami Malik, Westerville, OH (US); Hui Zhang, Columbus, OH (US)

(73) Assignee: Diamond Innovations, Inc., Worthington, OH (US)

( * ) Notice: Subject to any disclaimer, the term of this patent is extended or adjusted under 35 U.S.C. 154(b) by 238 days.

(21) Appl. No.: 13/705,693

(22) Filed: Dec. 5, 2012

(65) Prior Publication Data

US 2014/0013672 A1 Jan. 16, 2014

Related U.S. Application Data

(60) Provisional application No. 61/566,807, filed on Dec. 5, 2011.

(51) Int. Cl.

| | |
|---|---|
| B24D 3/00 | (2006.01) |
| B24D 11/00 | (2006.01) |
| B24D 18/00 | (2006.01) |
| C09C 1/68 | (2006.01) |
| C09K 3/14 | (2006.01) |
| B01J 3/06 | (2006.01) |
| C04B 35/528 | (2006.01) |
| C04B 35/645 | (2006.01) |

(52) U.S. Cl.
CPC ............ *B24D 18/00* (2013.01); *B01J 3/062* (2013.01); *C04B 35/528* (2013.01); *C04B 35/645* (2013.01); *B01J 2203/062* (2013.01); *B01J 2203/0605* (2013.01); *B01J 2203/068* (2013.01); *B01J 2203/0645* (2013.01); *B01J 2203/0655* (2013.01); *B01J 2203/0685* (2013.01); *C04B 2235/425* (2013.01); *C04B 2235/427* (2013.01); *C04B 2235/5296* (2013.01); *C04B 2235/5436* (2013.01); *C04B 2235/6567* (2013.01)

(58) Field of Classification Search
USPC ............................................ 51/307, 293, 308
See application file for complete search history.

(56) References Cited

U.S. PATENT DOCUMENTS

| | | | | |
|---|---|---|---|---|
| 3,488,153 | A * | 1/1970 | Bundy ........................... | 423/446 |
| 4,244,380 | A * | 1/1981 | DePauw et al. ................ | 460/108 |
| 6,749,033 | B2 * | 6/2004 | Griffin et al. .................. | 175/428 |
| 2011/0252711 | A1 | 10/2011 | Chakraborty et al. | |
| 2011/0252713 | A1 | 10/2011 | Chakraborty et al. | |

FOREIGN PATENT DOCUMENTS

| | | |
|---|---|---|
| EP | 0482372 A1 | 4/1992 |
| GB | 1215944 A | 12/1970 |

OTHER PUBLICATIONS

Walker, L.S. et al. "Toughening in graphene ceramic composites" ACS Nano, 2100. 5(4): p. 3182-3190.

Yu,Jing-jiang, et al. "Microscopic Characterizations of Few-Layer Hexagonal Boron Nitride: A Promising Analogue of Graphene". Application Note, Agilent Technologies.

* cited by examiner

*Primary Examiner* — James McDonough

(57) ABSTRACT

A method of making diamond including mixing graphene with diamond seed to form a powder mixture, and then sintering the powder mixture, in the absence of a transition metal catalyst, at high pressure and high temperature; and a method of making a polycrystalline diamond compact including mixing graphene in diamond powder to form a powder mixture with less than about 50% graphene by weight, and then sintering the powder mixture, in the absence of a transition metal catalyst, at high pressure and high temperature.

22 Claims, 7 Drawing Sheets

METHODS OF IMPROVING SINTERING OF PCD USING GRAPHENE

CROSS-REFERENCE TO RELATED APPLICATION

This application claims the benefit of the U.S. Provisional Application No. 61/566,807, filed Dec. 5, 2011.

TECHNICAL FIELD AND INDUSTRIAL APPLICABILITY

The present disclosure relates to methods of improving the properties of sintered polycrystalline diamond (PCD) that can be used, for instance, as cutting tools and in particular methods of adding graphene to diamond powder and then sintering the diamond to obtain PCD in which some or all of the graphene has converted to diamond, thereby enhancing intra-particle bonding of the diamond particles and resulting in improved properties (e.g., fracture toughness, thermal stability) of the PCD material.

PCD is formed by sintering diamond particles under high pressure and high temperature (HPHT) in the presence of a metal catalyst (such as cobalt, Co). Typical HPHT conditions include pressures at or above about 45 kBar and temperatures at or above about 1400° C. Carbon from the diamond particles is dissolved by, and then re-precipitated, as diamond, from the metal catalyst. The presence of the metal catalyst facilitates formation of inter-particle diamond growth, which binds the diamond particles together as a sintered compact. However, the metal catalyst remains in the PCD compact after the HPHT sintering process, and the presence of the metal catalyst is detrimental to PCD performance when the compact is used in cutting and machining applications. In particular, the presence of the metal catalyst in the PCD compact can have detrimental effects on the PCD when used in intended applications.

SUMMARY

In one embodiment, a method of making diamond includes steps of sintering a nano-scale single or multiple layer material, in the absence of a transition metal catalyst, at high pressure and high temperature.

In another embodiment, a method of making diamond comprises mixing a nano-scale single or multiple layer material with diamond seed to form a powder mixture; and sintering the powder mixture, in absence of a transition metal catalyst, at high pressure and high temperature.

In still another embodiment, a method of making a polycrystalline diamond compact comprises mixing graphene in diamond powder to form a powder mixture with less than about 90% graphene by volume, and sintering the powder mixture, in the absence of a transition metal catalyst, at high pressure and high temperature.

In yet another embodiment, a cutting element comprises polycrystalline superabrasive particles having substantially free of a catalytic material, wherein the polycrystalline superabrasive particles are converted from a nano-scale material with superabrasive particles as seeds at high pressure and high temperature.

It is to be understood that both the foregoing general description and the following detailed description are exemplary and explanatory and are intended to provide further explanation of the invention as claimed.

BRIEF DESCRIPTION OF THE DRAWINGS

The following detailed description can be read in connection with the accompanying drawings in which like numerals designate like elements.

DETAILED DESCRIPTION

Figure 1:
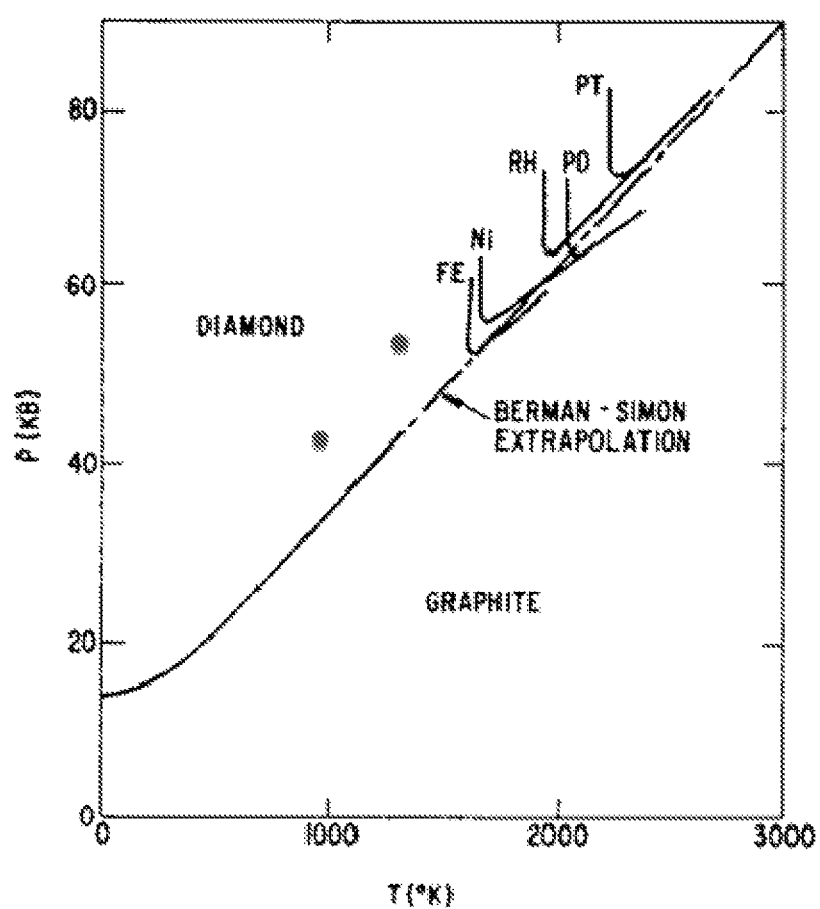
FIG. 1 is a phase diagram of diamond verses graphite.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 45%-55%. When the term, "substantially free", is used referring to catalyst in interstices, interstitial matrix, or in a volume of polycrystalline element body, such as polycrystalline diamond, it should be understood that many, if not all, of the surfaces of the adjacent diamond crystals may still have a coating of the catalyst. Likewise, when the term "substantially free" is used referring to catalyst on the surfaces of the diamond crystals, there may still be catalyst present in the adjacent interstices.

As used herein, the term "superabrasive particles" may refer to ultra-hard particles having a Knoop hardness of 5000 KHN or greater. The superabrasive particles may include diamond, cubic boron nitride, for example.

As used herein, the term "graphene" refers to a form of graphitic carbon, in which the carbon atoms are arranged in a 2-dimensional hexagonal lattice, that can be as thin as one atomic layer (<1 nm). These layers can also exist as multiple stacked sheets. The graphene particles have a very high aspect ratio such that, thickness (the z-axis) can be on the order of 100 nm (nanometers) whereas the 'x' and 'y' dimensions can be on the order of 100 μm (microns). The oxygen content of the material may be between about 1.0% to about 5.0%, in some embodiments about 1.2% to about 2.0% and in some embodiments, about 1.4%.

Experimental Procedure—X-ray diffraction analysis (XRD) was performed in Bragg-Brentano geometry using Cu Kα radiation generated at 40 keV and 40 mA on a Bruker D8 diffractometer. The samples were ground to a powder and analysis was done with the Jade™ software package.

The presence of a transition metal catalyst, such as Co, in a PCD compact may be detrimental to the properties of the compact when used in cutting and machining applications. However, existing processes for forming PCD from diamond powder require a catalyst to facilitate inter-particle diamond growth and bonding that turns diamond powder into a polycrystalline diamond compact.

A transition metal catalyst enables the formation of a PCD compact at industrially practical temperatures and pressures, but produces a PCD compact that may have compromised physical properties. In particular, a transition metal such as Co has a different coefficient of thermal expansion from that of diamond, so that when a PCD tool is used in a cutting or machining application that produces frictional heat, the difference in thermal expansion can cause the PCD tool to fracture and fail. In addition, because of the catalytic properties of the transition metal, the diamond in a tool being used at atmospheric pressure and elevated temperature can experience back conversion to graphite. Methods have been attempted, with limited success, to remove the transition metal after sintering, such as disclosed in U.S. Pat. Nos. 4,244,380 and 6,749,033.

However, this problem can better be solved by eliminating, or substantially reducing, the need for a transition metal catalyst in the first place. As described herein, a nano-scale material, such as graphene, for example, may be mixed into the diamond powder, prior to sintering at HPHT. Without being bound by theory, it is hypothesized that at least some of the graphene forms diamond when sintered at high pressure and high temperature. The nano-scale material may comprise a single or multiple layer.

Because graphene is nano-scale graphite in the form of individual single or multiple atom-thick sheets, it is believed to be a more reactive source of carbon that may more readily convert to diamond, even in the absence of catalyst. When mixed with diamond particles and then subjected to HPHT, at least some of the graphene is expected to convert to diamond which may be recovered as loose diamond powder. Alternatively, graphene may convert to diamond and promote inter-particle bonding and thus serve as a 'mortar' that binds the diamond particles together in a sintered polycrystalline diamond compact.

Hexagonal boron nitride (hBN), which has an atomic structure similar to graphite, can also form a graphene analog, known as 'white graphene.' White graphene can be formed in single- or multi-layer sheets, structurally analogous to graphene. White graphene, when mixed with cubic boron nitride particles and sintered at HPHT may display similar advantageous properties. Therefore, although the examples described herein are set forth specifically with regard to graphene, similar examples may be constructed using white graphene.

In an exemplary embodiment, it is expected that graphene conversion to diamond may be achieved by sintering in the presence of at least about 0.01%, for example, by weight diamond seed mixed with the graphene, at standard HPHT sintering conditions. In another exemplary embodiment, the diamond seed may be equal to or greater than about 0.1% %, for example, by weight of the powder mixture.

The compositions and sintering conditions are listed in Table 1 below. Test samples were prepared by pressing pills of a powder mixture including either graphene or graphite, and less than about 1% diamond seed crystal by weight. The diamond and graphene or graphite powders were dry mixed. Experiments were also conducted without diamond seed. No catalyst material was included in any of the experiments. Four different types of graphene (Table 2) were used in these experiments. The pills were assembled into cells for high pressure and high temperature sintering, and placed in a 90° C. oven under vacuum for several days in order to remove any adsorbed moisture.

The experiments are listed as five sets in Table 1 to facilitate the discussion. Note that the different graphene materials listed in Table 2 have 'z' dimension and 'x' and 'y' dimensions that are different. An aspect ratio may be used to describe the shape of the particles. The aspect ratio, used herein, may be defined a ratio of the length to the width ('x' or 'y' divided by 'z'). The aspect ratios of the graphene platelets also vary greatly. The pressing conditions were chosen based on the carbon phase diagram (FIG. 1). The two conditions chosen, represented by the red dots, are well within the diamond stable region. However, the kinetics of transformation is so slow that direct conversion of graphite to diamond is not an industrially viable process.

Figure 2:
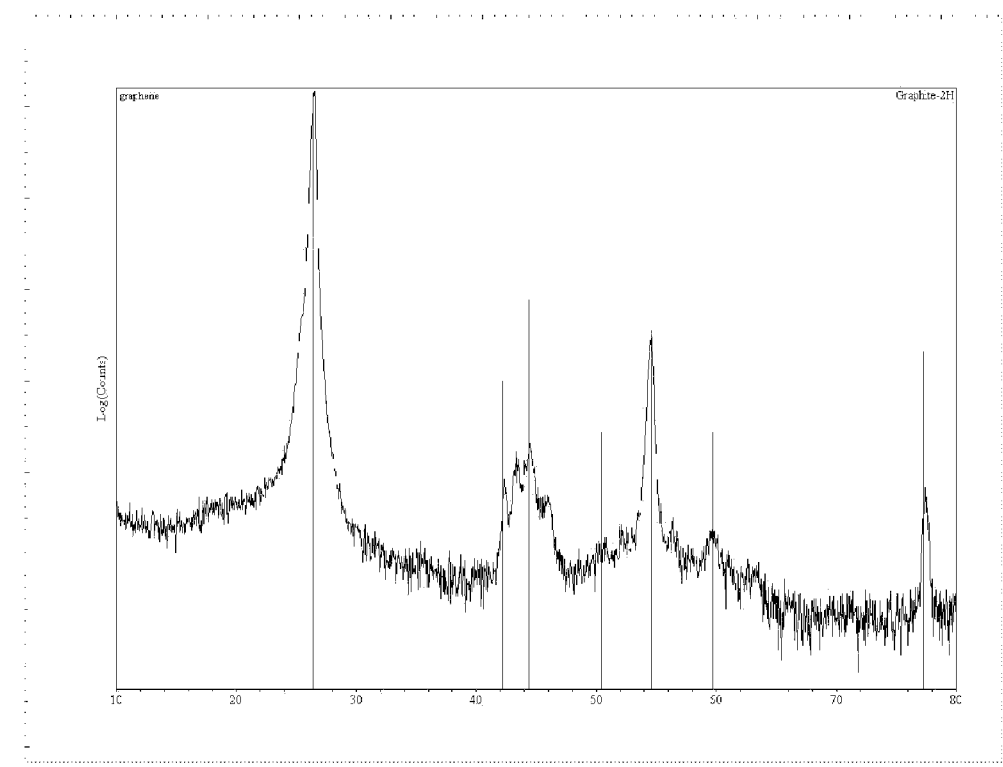
FIG. 2 is a representative X-ray diffraction (XRD) pattern for graphene alone, prior to any sintering process. The XRD pattern shows that no diamond is detected.

The XRD pattern of graphene, FIG. 2, is very similar to that of graphite. In particular, the peaks at about 26°, about 45°, and about 55° in 2-theta correspond closely with that of graphite.

Figure 3:
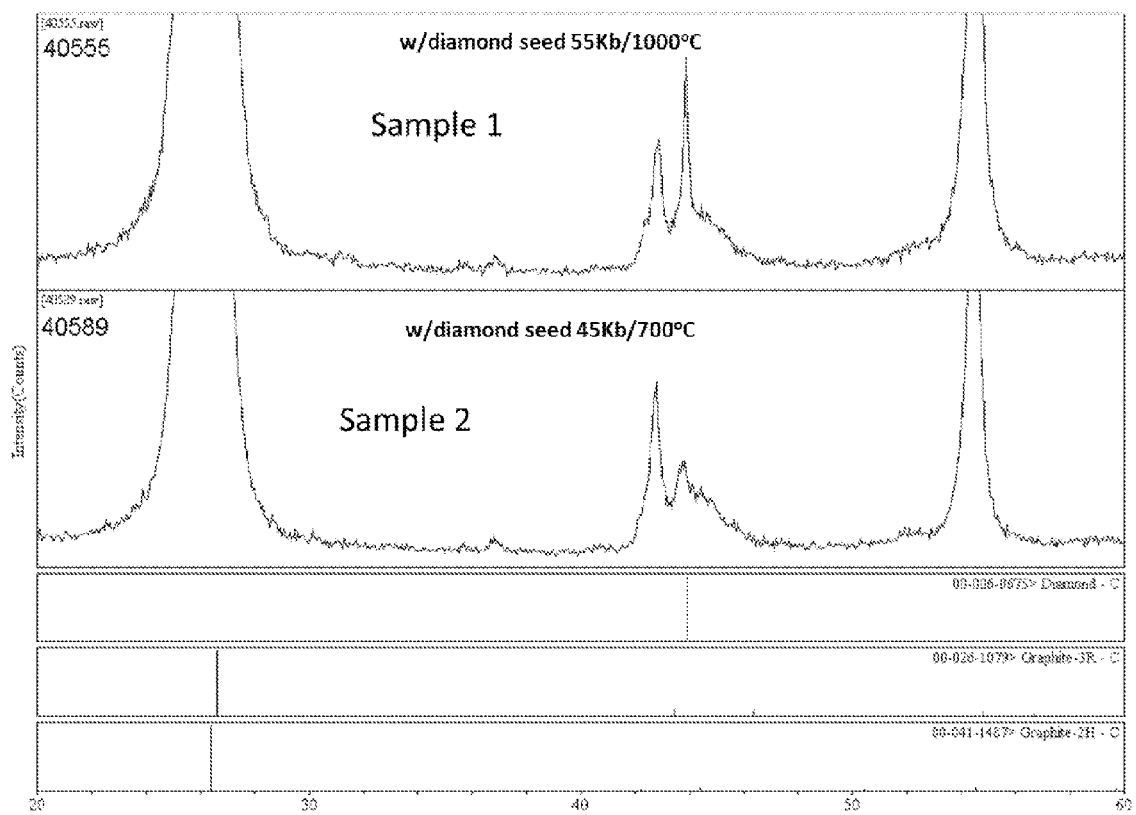
FIG. 3 is a comparison of representative XRD patterns for graphene after it has been pressed at 55 kBar and 1000° C. (top pattern) and 45 kBar and 700° C. (bottom pattern) for 5 minutes. Diamond is detected in both cases, but a comparison of the two patterns indicates a more intense diamond peak at the higher pressure and higher temperature sintering conditions. No catalyst was present in either sintering.

The result of each experiment is summarized in Table 1 in the last column. The first two experimental results show that crystalline diamond was detectable in both samples. In one exemplary embodiment, the sintering may be performed at a pressure of at least about 45 kBar and a temperature of at least about 700° C. In another exemplary embodiment, the sintering may be performed at a pressure of at least about 55 kBar and a temperature of at least about 1000° C. The sintering may be performed for a time period of about 5 minutes, for example. The XRD patterns are compared in FIG. 3. It can be seen that, while both samples contain mostly graphitic carbon, the XRD peak attributable to diamond, at about 44° in 2-theta, is sharper and stronger for Sample 1. This is interpreted to mean that more diamond was formed at this condition. In contrast, reaction with graphite under the same condition, Sample 3 did not produce any detectable diamond. The experiment with graphite was repeated again (Sample 4), this time with no diamond seed, and no diamond was detected.

Figure 4:
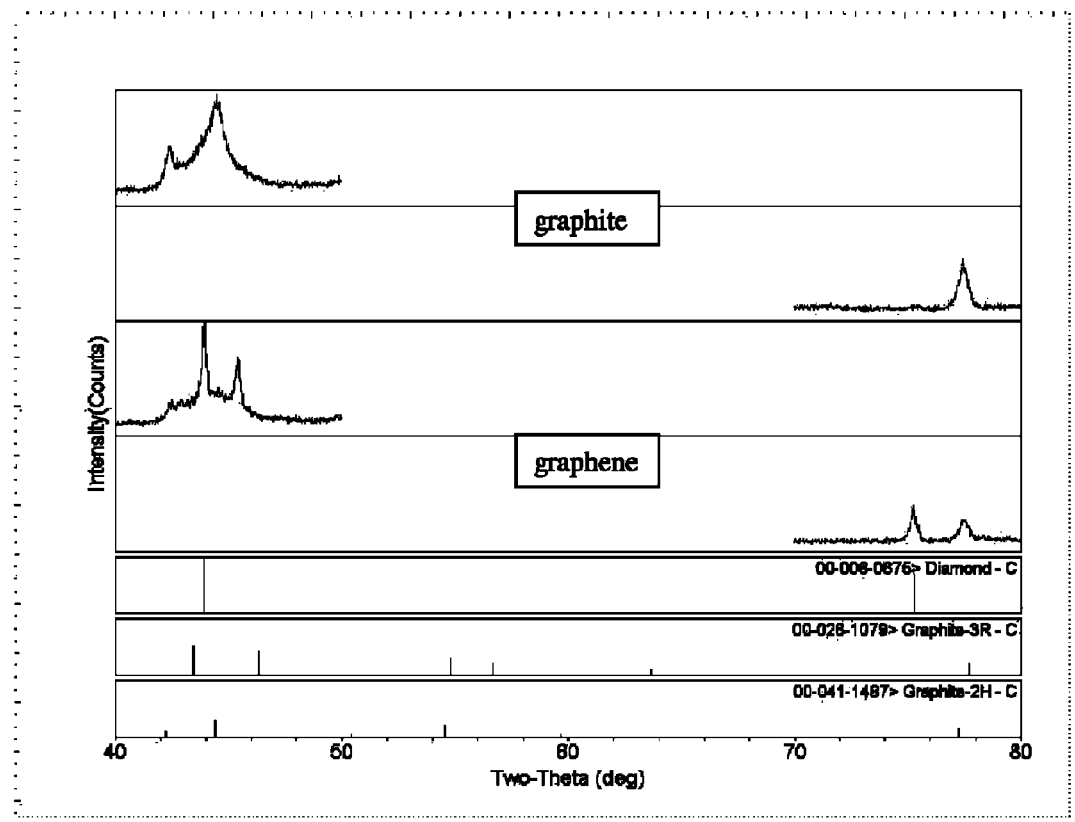
FIG. 4 is a comparison of representative XRD patterns for graphite (top two patterns) and graphene (bottom two patterns) when pressed under identical HPHT conditions of 55 kBar and 1000° C. for 5 minutes. The two parts of the patterns show the relevant portions of the spectra where diamond peaks are found. No catalyst was present in any of the sintering experiments. Comparison of the graphite and graphene patterns indicates that diamond was formed from graphene but not from graphite.

Sample 5 was a repeat experiment of Sample 1 and the result was the same, formation of diamond, as observed before. The XRD results for graphene (Sample 5) and graphite (Sample 3) are compared in FIG. 4. As listed in Table 1, the conditions for these two experiments were identical. But the starting material gives very different results. No diamond is detected when starting with graphite, whereas diamond is detected when starting with graphene.

Figure 5:
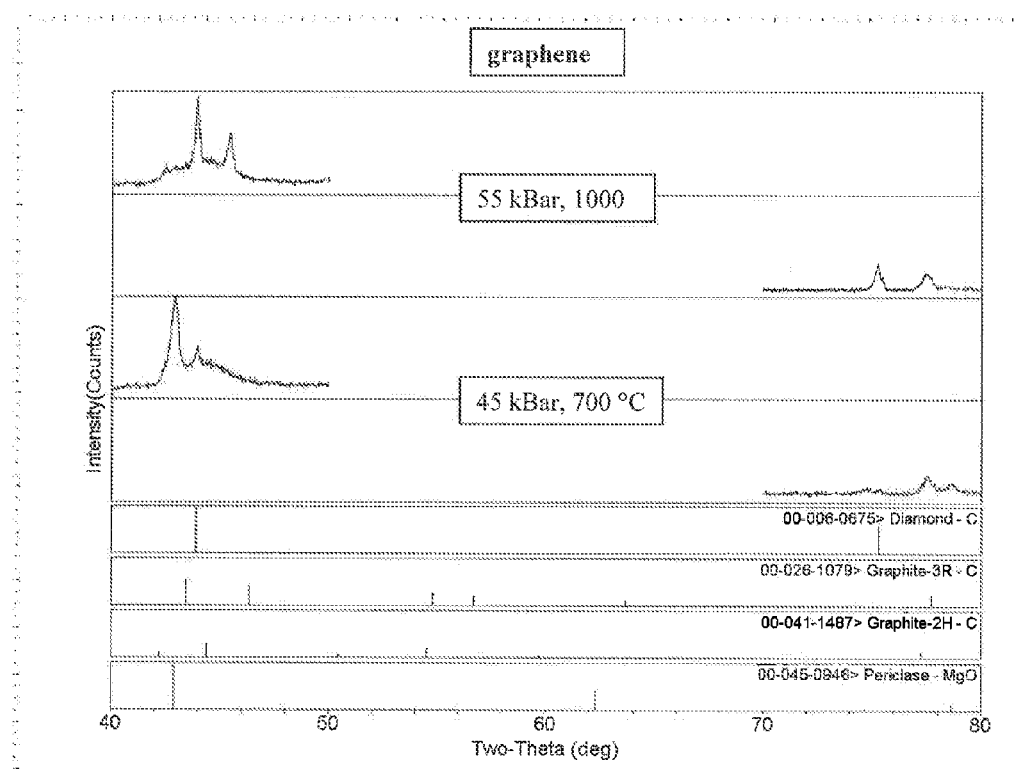
FIG. 5 is a comparison of representative XRD patterns for graphene after it has been pressed at 55 kBar and 1000° C. for 5 minutes (top pattern) and 45 kBar and 700° C. for 10 minutes (bottom pattern). This is essentially a repeat of the same experiment as in FIG. 2. Diamond is detected in both cases, but a comparison of the two patterns indicates a more intense diamond peak at the higher pressure and higher temperature sintering conditions. No catalyst was present in either sintering.

Sample 6 was a repeat experiment of Sample 2, but with a longer soak time (10 minutes instead of 5 minutes). Although diamond was again detected at this condition, it was a weak signal, similar to what was observed in Sample 2. The XRD pattern for Sample 6 is compared with that of Sample 5 in FIG. 5. The XRD results show that the pressing parameters are important in diamond formation. In our experiments, it was found that 55 kBar and 1000° C. led to more diamond formation.

Figure 6:
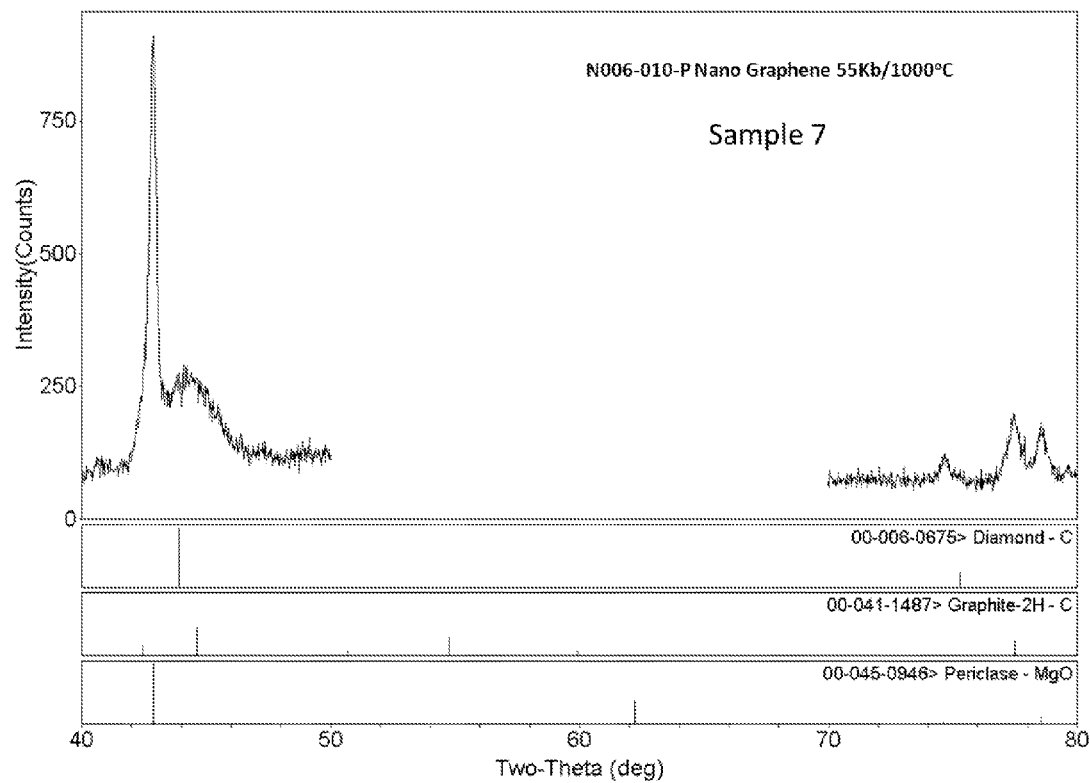
FIG. 6 is an exemplary view of XRD pattern for graphene after it has been pressed under 55 kb and 1000° C.

Sample 7 was an experiment to determine whether diamond could be formed without the addition of seed crystal, at the condition of 55 kBar and 1000° C. Although diamond was detected by XRD (FIG. 6), it was only a weak signal.

Samples 8 through 11 were an investigation with a different graphene, type 'B' as listed in Table 2. All of the conditions, with and without seed, and pressing 45 kBar and 700° C. or pressing at 55 kBar and 1000° C. did not yield any diamond detectable by XRD.

Samples 12 through 15 were an investigation with graphene, type 'C' as listed in Table 2. All of the conditions were the same as for Samples 8 through 11. None of these experiments yielded any diamond detectable by XRD.

Figure 7:
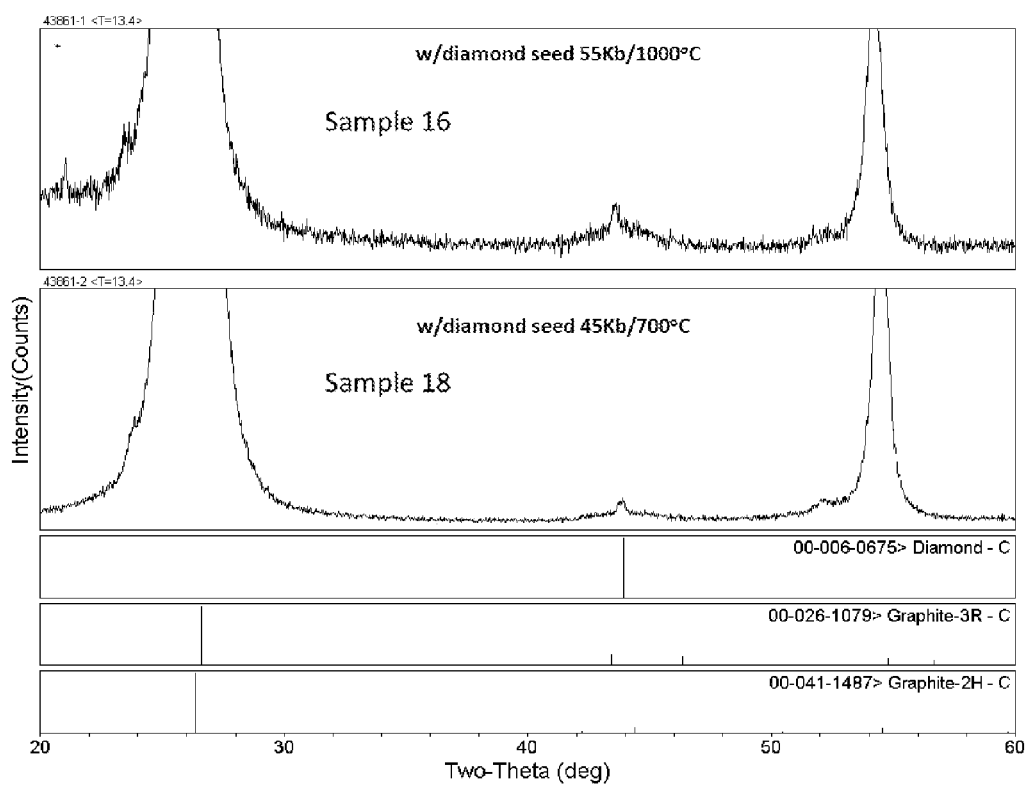
FIG. 7 is a comparison of representative XRD patterns for graphene with diamond seeds after it has been pressed at 55 kBar and 1000° C. (top pattern) and 45 kBar and 700° C. (bottom pattern) for 5 minutes.

Sample 16 through 19 were an investigation with graphene, type 'D' as listed in Table 2. There was a very weak signal of detectable diamond in all of these samples except Sample 17. The XRD patterns of Sample 16 and 18 are compared in FIG. 7 and show that the diamond signal is weak. However, as seen before, it appears that the diamond signal for pressing condition 55 kBar and 1000° C. is slightly stronger.

From these foregoing experiments, it can be concluded that there are several factors controlling diamond formation in graphene. Firstly, graphene itself, and not graphite, is important. Secondly, the presence of a small quantity of diamond seed, presumably serving as a nucleation site for crystal growth, is important. Thirdly, pressing at 55 kBar and 1000° C., or more generally, pressing at higher pressure and temperature, but staying within the diamond stable region of the phase diagram, is important. Fourthly, the correct type of graphene is important because it will be noted that most of the graphene with 'z' dimension of 50-100 nm did not form diamond.

However, the graphene type is possibly more a function of the aspect ratio. The graphene type with aspect ratio around 1000 (type 'A') formed diamond. However graphene with aspect ratio much less, type 'B' and 'C' did not. Diamond formation was marginally successful with graphene type 'D' which has an aspect ratio closer to 1000. So the graphene may have an aspect ratio of 500-2000. in order to be converted to diamond.

TABLE 1

Summary or experiments with graphene and graphite.

| | Samples | Composition | | Pressing Condition | | | |
| --- | --- | --- | --- | --- | --- | --- | --- |
| | | Materials (g) | Diamond Seed (g) | Temperature (° C.) | Pressure (Kb) | Soak time (m) | Diamond peak? |
| Set I | 1 | A | 0.955 | 0.007 | 1000 | 55 | 5 | Strong |
| | 2 | A | 0.955 | 0.007 | 700 | 45 | 5 | Weak |
| Set II | 3 | Graphite | 1.060 | 0.007 | 1000 | 55 | 5 | None |
| | 4 | Graphite | 1.060 | — | 1000 | 55 | 5 | None |
| | 5 | A | 0.952 | 0.007 | 1000 | 55 | 5 | Strong |
| | 6 | A | 0.952 | 0.007 | 700 | 45 | 10 | Weak |
| | 7 | A | 0.952 | — | 1000 | 55 | 5 | Weak |
| Set III | 8 | B | 0.977 | 0.008 | 1000 | 55 | 5 | None |
| | 9 | B | 0.977 | — | 1000 | 55 | 5 | None |
| | 10 | B | 0.977 | 0.008 | 700 | 45 | 10 | None |
| | 11 | B | 0.977 | — | 700 | 45 | 10 | None |
| Set IV | 12 | C | 0.994 | 0.008 | 1000 | 55 | 5 | None |
| | 13 | C | 0.994 | — | 1000 | 55 | 5 | None |
| | 14 | C | 0.994 | 0.008 | 700 | 45 | 10 | None |
| | 15 | C | 0.994 | — | 700 | 45 | 10 | None |
| Set V | 16 | D | 0.990 | 0.008 | 1000 | 55 | 5 | weak |
| | 17 | D | 0.990 | — | 1000 | 55 | 5 | None |
| | 18 | D | 0.990 | 0.008 | 700 | 45 | 10 | Very weak |
| | 19 | D | 0.990 | — | 700 | 45 | 10 | Very weak |

TABLE 2

Properties of the graphene materials used in this study.

| Graphene materials | Average dimension x & y | Average dimension z | Aspect ratio range |
| --- | --- | --- | --- |
| A | ≤14.00 μm | 10 nm-20 nm | 700-1400 |
| B | ≤5.00 μm | 50 nm-100 nm | 50-100 |
| C | ≤10 μm | 50 nm-100 nm | 100-200 |
| D | ≤44.00 μm | 50 nm-100 nm | 440-880 |

Our experiments show that, generally, higher pressure and temperature leads to faster diamond formation. Calculations, presented in Table 3 provide a theoretical basis for this observation. In the diamond stable region of the phase diagram (FIG. 1) there is an energy stabilization realized upon conversion from graphene to diamond. This energy stabilization has been calculated for several different conditions in Table 3. Larger stabilization energy (also known as 'driving force' for the reaction), can be expected to lead to faster diamond formation. From the table, it can be seen that, at 55 kBar and 1000° C., the driving force is about 2.3 kJ/mol, whereas at 45 kBar and 700° C., it is about 2.0 kJ/mol. Going to higher pressure of 65 kBar, we see that, at 1200° C., it is about 3.0 kJ/mol, but that it decreases to about 1.4 kJ/mol upon increasing the temperature to 1600° C. The highest stabilization energy, about 3.7 kJ/mol, is calculated for 75 kBar and 1400° C.

TABLE 3

Energy stabilization of graphene upon conversion to diamond.

| Pressure (kbar) | Temperature (° C.) | Driving force (J/mol) |
| --- | --- | --- |
| 75 | 1400 | 3761.1 |
| 75 | 1600 | 2971.6 |
| 75 | 1800 | 2181.6 |
| 75 | 2000 | 1388.0 |
| 65 | 1200 | 3022.5 |
| 65 | 1300 | 2618.6 |
| 65 | 1400 | 2214.0 |
| 65 | 1600 | 1403.5 |
| 55 | 1000 | 2286.2 |
| 45 | 700 | 1960.7 |

An exemplary embodiment of the present invention may further include a method of making diamond from graphene. The method may comprise steps of subjecting graphene with aspect ratio in the range of 500 to 2000 and subjecting it to high pressure and high temperature, for a time period greater than one minute, such that the driving force for conversion may be greater than 2.0 kJ/mol.

A further exemplary embodiment of the present invention may include a method of making diamond from graphene. The method may comprise steps of mixing graphene, with aspect ratio in the range of 500 to 2000, with about 1.0% diamond powder, to form a powder mixture. Then subjecting this powder mixture to high pressure and high temperature, for a time period greater than one minute, such that the driving force for conversion may be greater than 2.0 kJ/mol.

An exemplary embodiment of the present invention may further include a method of making a polycrystalline diamond compact. The method may comprise steps of mixing graphene with diamond powder to form a powder mixture with less than about 95%, for example, graphene by volume; and sintering the powder mixture in the absence of a transition metal catalyst at high pressure and high temperature, such that the driving force for conversion is greater than 2.0 kJ/mol, for a time period of at least about 5 minutes, for example. The graphene may have an aspect ratio of 500 to 2000 in order to be converted to polycrystalline diamond. In one exemplary embodiment, the powder mixture may include about 1% to about 10% graphene, for example. Graphene may be converted to diamond and serve as a mortar or bridge that binds the diamond particles together in a sintered polycrystalline diamond compact.

In one exemplary embodiment, the sintering may be performed at a pressure of at least about 45 kBar and a temperature of at least about 700° C., for example. In another exemplary embodiment, the sintering may be performed at a pressure of at least about 55 kBar and a temperature of at least about 1000° C., for example. In still another exemplary embodiment, the sintering may be performed at high pressure and high temperature conditions such that the driving force for the reaction is at least 2.0 kJ/mol.

Another exemplary embodiment may further include a cutting element which comprises polycrystalline superabrasive particles, such as diamonds, being substantially free of a catalytic material, such as cobalt. The polycrystalline superabrasive particles may be converted from a single or multiple layer of nano-scale material, such as graphene, with superabrasive particles as seeds at high pressure and high temperature. The graphene may have an aspect ratio of 500 to 2000 in order to be converted to polycrystalline diamond.

Although described in connection with preferred embodiments thereof, it will be appreciated by those skilled in the art that additions, deletions, modifications, and substitutions not specifically described may be made without departure from the spirit and scope of the invention as defined in the appended claims.

What is claimed is:

1. A method of making diamond comprising:
sintering nano-scale graphene having an aspect ratio of 500 to 2000, in the absence of a transition metal catalyst, at high pressure and high temperature, wherein the sintering is performed at a pressure of up to about 75 kBar.

2. The method of claim 1, wherein the sintering is performed for a time period of about 5 minutes.

3. The method of claim 1 wherein the sintering is performed at a pressure of about 75 kBar and a temperature of at least about 1400° C.

4. The method of claim 1, wherein the sintering is performed at a pressure of at least about 45 kBar and a temperature of at least about 700° C.

5. The method of claim 1, wherein the sintering is performed at a pressure of at least about 55 kBar and a temperature of at least about 1000° C.

6. A method of making diamond comprising:
mixing nano-scale graphene having an aspect ratio of 500 to 2000 with diamond seed to form a powder mixture; and
sintering the powder mixture, in absence of a transition metal catalyst, at high pressure and high temperature, wherein the sintering is performed at a pressure up to about 75 kBar.

7. The method of claim 6, wherein the diamond seed is equal to or greater than about 0.01% by weight of the powder mixture.

8. The mixture of claim 6, wherein the diamond seed is equal to or greater than about 0.1% by weight of the powder mixture.

9. The method of claim 6, wherein the sintering is performed for a time period of about 5 minutes.

10. The method of claim 6 wherein the sintering is performed at a pressure of about 75 kBar and a temperature of at least about 1400° C.

11. The method of claim 6, wherein the sintering is performed at a pressure of at least about 45 kBar and a temperature of at least about 700° C.

12. The method of claim 6, wherein the sintering is performed at a pressure of at least about 55 kBar and a temperature of at least about 1000° C.

13. A method of making a polycrystalline diamond compact comprising:
Mixing nano-scale graphene having an aspect ratio of 500 to 2000 in diamond powder to form a powder mixture with less than about 90% graphene by volume; and sintering the powder mixture, in the absence of a transition metal catalyst, at high pressure and high temperature, wherein the sintering is performed at a pressure up to about 75 kBar.

14. The method of claim 13, wherein the powder mixture includes about 1% to about 10% graphene by volume.

15. The method of claim 13, wherein the sintering is performed for a time period of at least about 5 minutes.

16. The method of claim 13 wherein the sintering is performed at a pressure of about 75 kBar and a temperature of at least about 1400° C.

17. The method of claim 13, wherein the sintering is performed at a pressure of at least about 45 kBar and a temperature of at least about 700° C.

18. The method of claim 13, wherein the sintering is performed at a pressure of at least about 55 kBar and a temperature of at least about 1000° C.

19. The method of claim 1, wherein the sintering is performed for a time period of up to about 10 minutes.

20. The method of claim 1, wherein the high pressure and the high temperature of the sintering process provide a driving force of greater than about 2 kJ/mol when the graphene is converted to diamond.

21. The method of claim 6, wherein the sintering is performed for a time period of up to about 10 minutes.

22. The method of claim 6, wherein the high pressure and the high temperature of the sintering process provide a driving force of greater than about 2 kJ/mol when the graphene is converted to diamond.

* * * * *